United States Patent [19]

Matsumoto et al.

[11] Patent Number: 5,165,751
[45] Date of Patent: Nov. 24, 1992

[54] AIR SPOILER DEVICE

[75] Inventors: Masaharu Matsumoto; Nobuo Ito, both of Yokohama, Japan

[73] Assignee: Ohi Seisakusho Co., Ltd., Yokohama, Japan

[21] Appl. No.: 719,682

[22] Filed: Jun. 25, 1991

Related U.S. Application Data

[63] Continuation of Ser. No. 428,783, Oct. 30, 1989, abandoned.

[30] Foreign Application Priority Data

Oct. 31, 1988 [JP] Japan .................. 63-274737
Oct. 31, 1988 [JP] Japan .................. 63-274738
Oct. 31, 1988 [JP] Japan .................. 63-274739

[51] Int. Cl.$^5$ ............................................ B62D 35/00
[52] U.S. Cl. .................... 296/180.5; 296/76
[58] Field of Search ............ 296/180.1, 180.3, 180.5, 296/216, 220, 221, 76

[56] References Cited

U.S. PATENT DOCUMENTS

| | | | |
|---|---|---|---|
| 4,738,479 | 4/1988 | Filtri et al. | |
| 4,773,692 | 9/1988 | Schleicher et al. | 296/180.5 |
| 4,810,022 | 3/1989 | Takagi et al. | 296/180.5 |
| 4,854,635 | 8/1989 | Durm et al. | 296/180.5 |
| 4,869,548 | 9/1989 | Nagata et al. | 296/221 |
| 4,877,285 | 10/1989 | Huyer | 296/220 X |
| 4,889,382 | 12/1989 | Burst et al. | 296/180.5 |

FOREIGN PATENT DOCUMENTS

| | | | |
|---|---|---|---|
| 2726507 | 12/1978 | Fed. Rep. of Germany | |
| 2624823 | 6/1989 | France | |
| 0211127 | 9/1986 | Japan | 296/216 |
| 2207700 | 2/1989 | United Kingdom | 296/221 |

Primary Examiner—Dennis H. Pedder
Attorney, Agent, or Firm—Foley & Lardner

[57] ABSTRACT

Disclosed herein is an air spoiler device which comprises a base member; two rail members secured to the base member and extending in parallel with each other; two sliders slidably and respectively engaged with the rail members, so that each slider is slidable forwardly and rearwardly along the corresponding rail member; two supporting leg units respectively mounted on the sliders; a spoiler fin mounted on the two supporting leg units; and a drive for moving the sliders forwardly and rearwardly along the rail members.

22 Claims, 7 Drawing Sheets

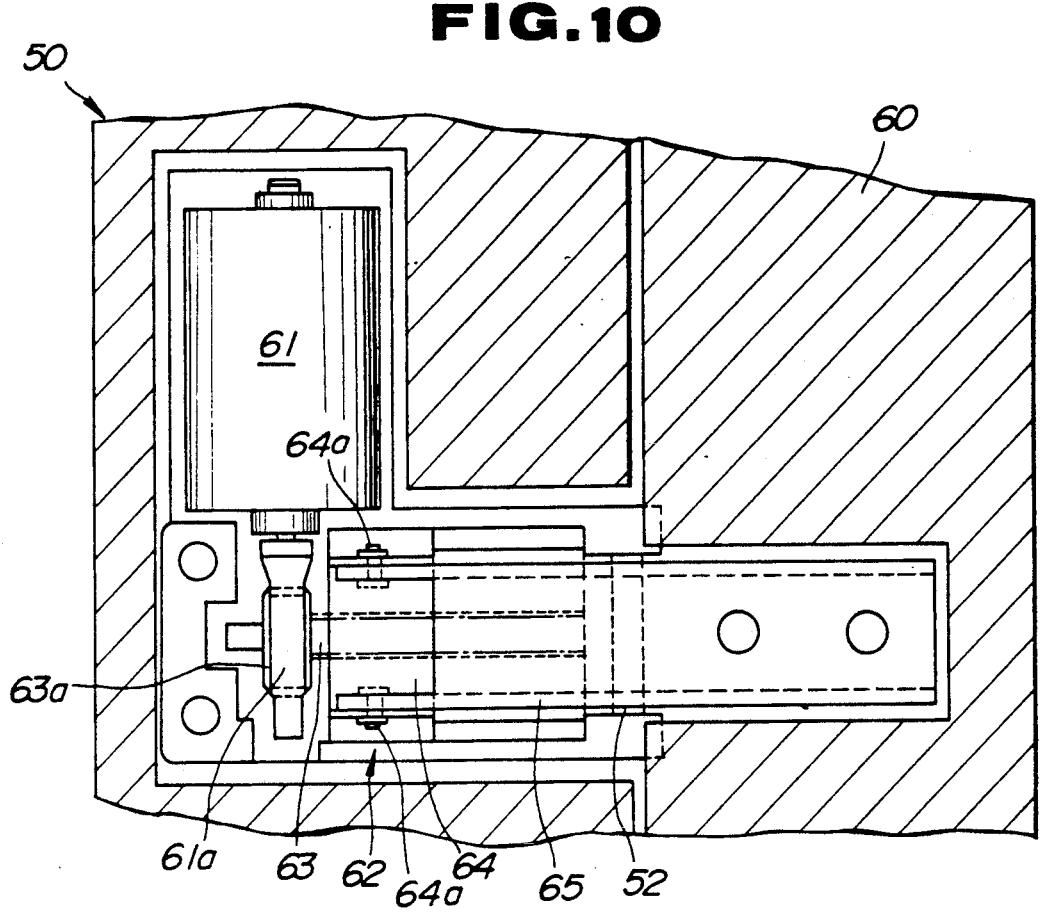
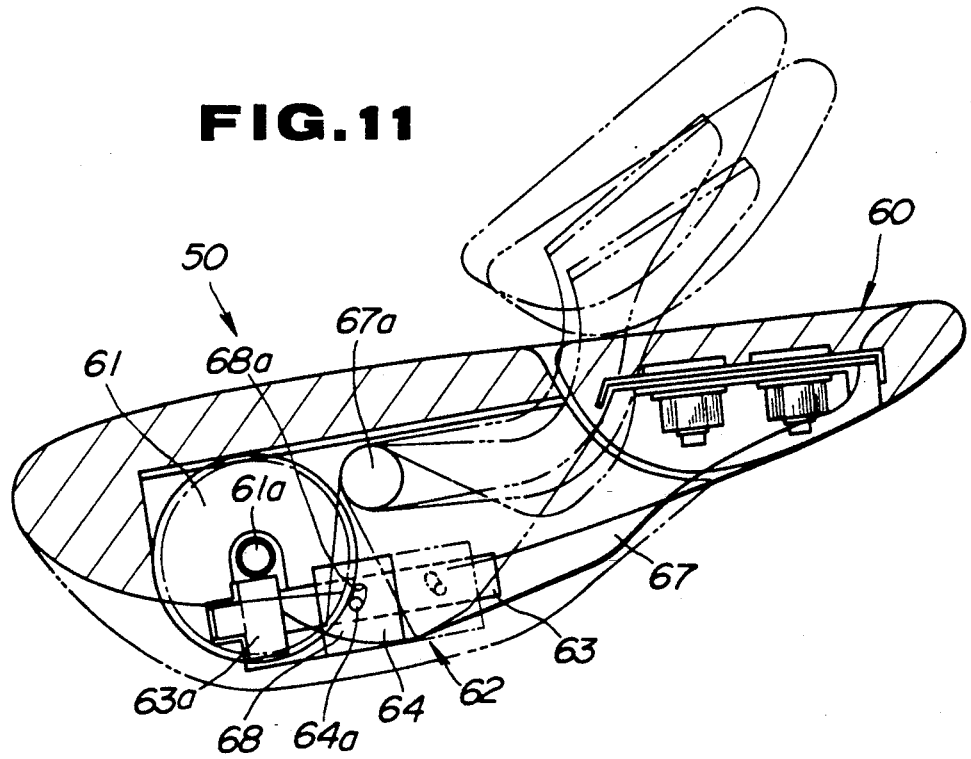

AIR SPOILER DEVICE

This application is a continuation of application Ser. No. 07/428,783 filed Oct. 30, 1989, abandoned.

BACKGROUND OF THE INVENTION

1. Field of the Invention

The present invention relates in general to air spoilers for a motor vehicle, and more particularly to rear spoilers of a type which can move between an operative position and an inoperative position.

2. Description of the Prior Art

Hitherto, various types of rear spoilers for motor vehicles have been proposed and put into practical use in order to improve the high-speed stability of the vehicle.

Some of them are of a fixed type in which a spoiler fin is unmovably mounted on a rear end of the vehicle. However, this type rear spoiler becomes a nuisance when the vehicle is parked or runs at a lower speed.

In order to eliminate such drawback, a so-called "retractable rear spoiler" has been proposed, in which the spoiler fin is wholly retracted in the body of the vehicle when the stabilizing effect of the spoiler becomes unnecessary. However, this type of spoiler narrows remarkably the interior space, viz., the rear trunk room, of the vehicle due to the inherency of the retractable construction thereof.

Furthermore, when the rear spoiler is mounted on a rear end of a spring-biased pivotal trunk lid of the vehicle, it becomes necessary to replace the hitherto-used lid spring with a high power one in order to bear the increased moment caused by the provision of the spoiler on the rear end of the trunk lid.

SUMMARY OF THE INVENTION

It is therefore an object of the present invention to provide a rear spoiler device which is free of the above-mentioned drawbacks.

In a first aspect of the present invention, there is provided an air spoiler device which comprises a base member; two rail members secured to the base member and extending in parallel with each other; two sliders slidably and respectively engaged with the rail members, so that each slider is slidable forwardly and rearwardly along the corresponding rail member; two supporting leg units respectively mounted on the sliders; a spoiler fin mounted on the two supporting leg units; and drive means for moving the sliders forwardly and rearwardly along the rail members.

In a second aspect of the present invention, there is provided an air spoiler device which comprises a base member; two rail members secured to the base member and extending in parallel with each other; two sliders slidably and respectively engaged with the rail members, so that each slider is slidable forwardly and rearwardly along the corresponding rail member; two supporting leg units respectively mounted on the sliders; a spoiler fin mounted on the two supporting leg units; drive means for moving the sliders forwardly and rearwardly along the rail members; and folding and raising means which folds the two supporting leg units to lower the spoiler fin when the sliders are moved to front portions of the rail members and raises the two supporting leg units to raise the spoiler fin when the sliders are moved back to rear portions of the rail members.

In a third aspect of the present invention, there is provided an air spoiler device which comprises a base member; two rail members secured to the base member and extending in parallel with each other; two sliders slidably and respectively engaged with the rail members, so that each slider is slidable forwardly and rearwardly along the corresponding rail member; two supporting leg units respectively mounted on the sliders; a spoiler fin mounted on the two supporting leg units; drive means for moving the sliders forwardly and rearwardly along the rail members; folding and raising means which folds the two supporting leg units to lower the spoiler fin when the sliders are moved to front portions of the rail members and raises the two supporting leg units to raise the spoiler fin when the sliders are moved back to rear portions of the rail members; a flap pivotally mounted on the spoiler fin, the flap being pivotal between a raised position wherein the flap is raised from the spoiler fin and a rest position wherein the flap is neatly received in a container space defined in the spoiler fin; and two identical drive units mounted in the spoiler fin to actuate the flap.

BRIEF DESCRIPTION OF THE DRAWINGS

Other objects and advantages of the present invention will become apparent from the following description when taken in conjunction with the accompanying drawings, in which:

FIG. 10 is a sectional view taken along the line X—X of FIG. 9; and

FIG. 11 is a view similar to FIG. 9, but showing a modification of the flap mechanism.

DETAILED DESCRIPTION OF THE INVENTION

Referring to the accompanying drawings, particularly FIGS. 1 to 4, there is shown a rear spoiler device according to the present invention, which is generally designated by numeral 10.

Figure 3:
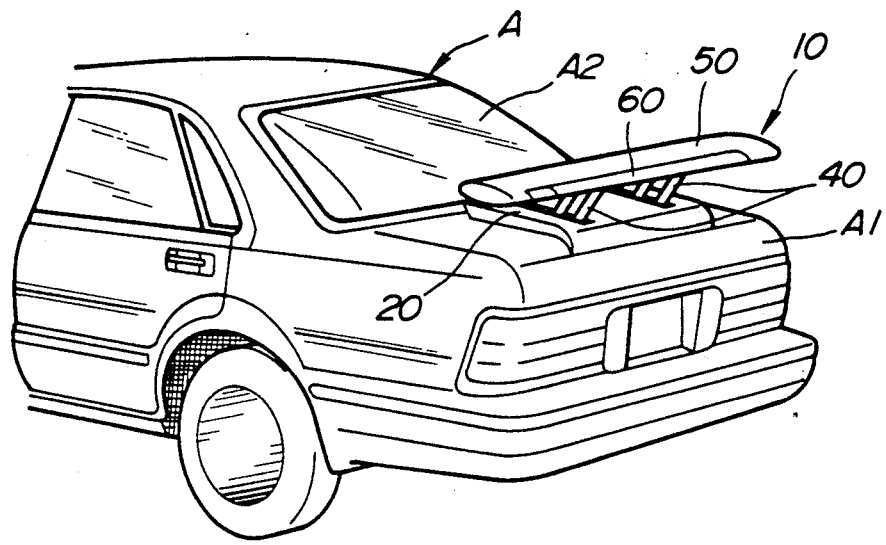
FIG. 3 is a partial view of the vehicle, showing that a spoiler fin of the rear spoiler device assumes its "in-use" (or raised) position.
Figure 4:
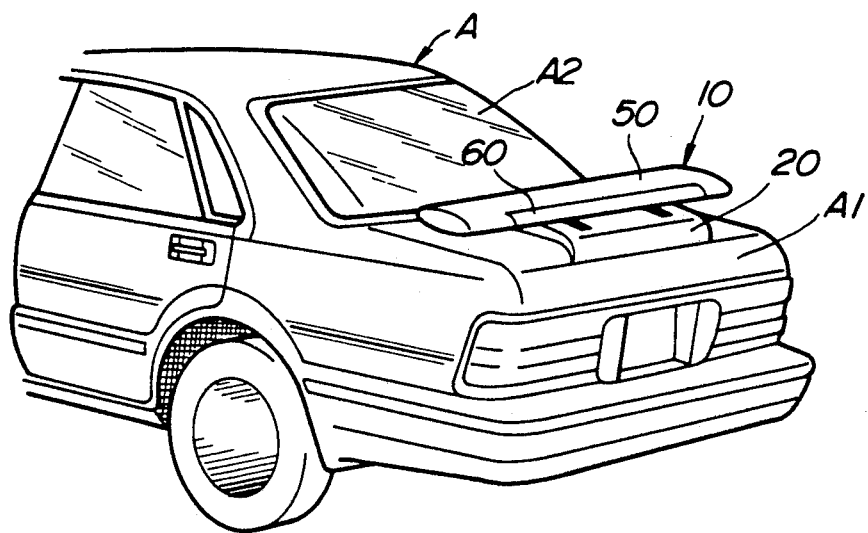
FIG. 4 is a view similar to FIG. 3, but showing that the spoiler fin of the rear spoiler device assumes its "not in-use" (or sunken) position.
Figure 5:
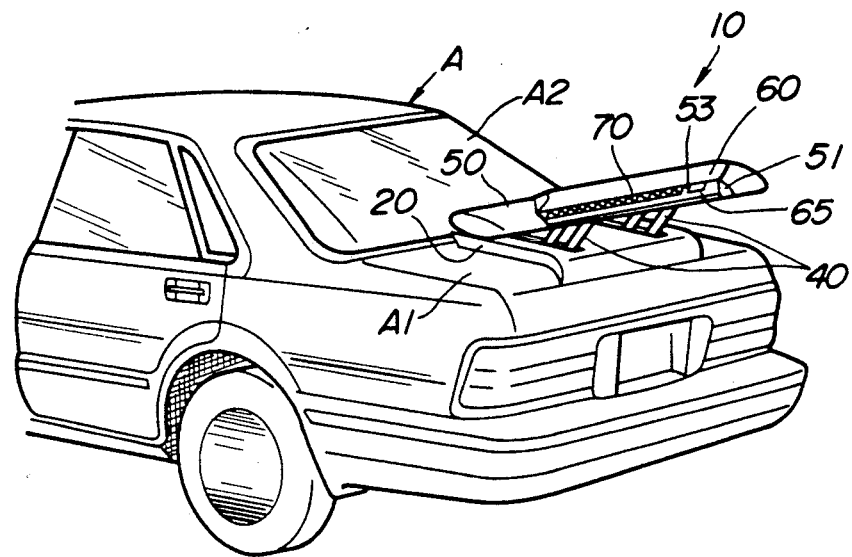
FIG. 5 is a view also similar to FIG. 3, but showing that the spoiler fin assumes its "in-use" position with a flap kept raised.

As is seen from FIGS. 3 and 4, the rear spoiler device 10 is mounted on a trunk lid A1 of a passenger motor vehicle A. As will be described in detail hereinafter, a spoiler fin of the rear spoiler device 10 is moved between its "in-use" (or raised rear) position as shown in FIG. 3 and its "not in-use" (or folded front) position as shown in FIG. 4.

Figure 2:
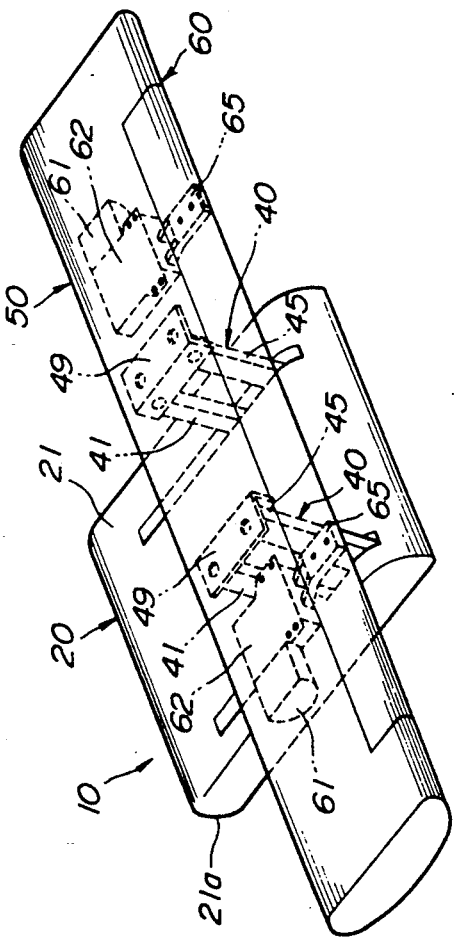
FIG. 2 is a perspective view of the rear spoiler device of the invention; o

As is best seen from FIGS. 2 and 3, the rear spoiler device 10 comprises generally a base member 20 securedly mounted on the trunk lid A1, a pair of supporting leg units 40 and 40 extending from the base member 20 and a spoiler fin 50 mounted on the supporting leg units 40 and 40.

The base member 20 has a flat casing 21 flatly mounted on the trunk lid A1. As is seen from FIG. 1, the base member 20 has an inclined front edge 21a positioned near a rear window A2 of the vehicle A.

Within the base member 20, there is securedly installed a generally U-shaped guide rail structure 25 which serves also as a frame of the base member 20. As will be understood from FIGS. 1 and 7, the U-shaped guide rail structure 25 is of a channel member having its opening directed upward and includes a straight base portion (no numeral) which extends along the front edge 21a of the base member 20 and opposed side rail portions 26 and 26 (see FIG. 7) which extend rearwardly from respective ends of the base portion.

The opposed side rail portions 26 and 26 have respective sliders 27 and 27 slidably engaged therewith. Thus, each slider 27 is slidable forward and rearward along the corresponding side rail portion 26.

Each side rail portion 26 has an elongate supporting plate 28 which extends therealong and is secured thereto. An elongate wall member 29a is secured to each supporting plate 28 and extends along the same. As will be seen from FIG. 1, each elongate wall member 29a has at its inside surface a longitudinally extending guide groove 29 which is bent at a middle part. That is, the guide groove 29 comprises an upper straight part (no numeral) provided at a front portion of the wall member 29a, a lower straight part (no numeral) provided at a rear portion of the wall member 29a and an inclined junction part (no numeral) provided between the upper and lower straight parts.

Figure 1:
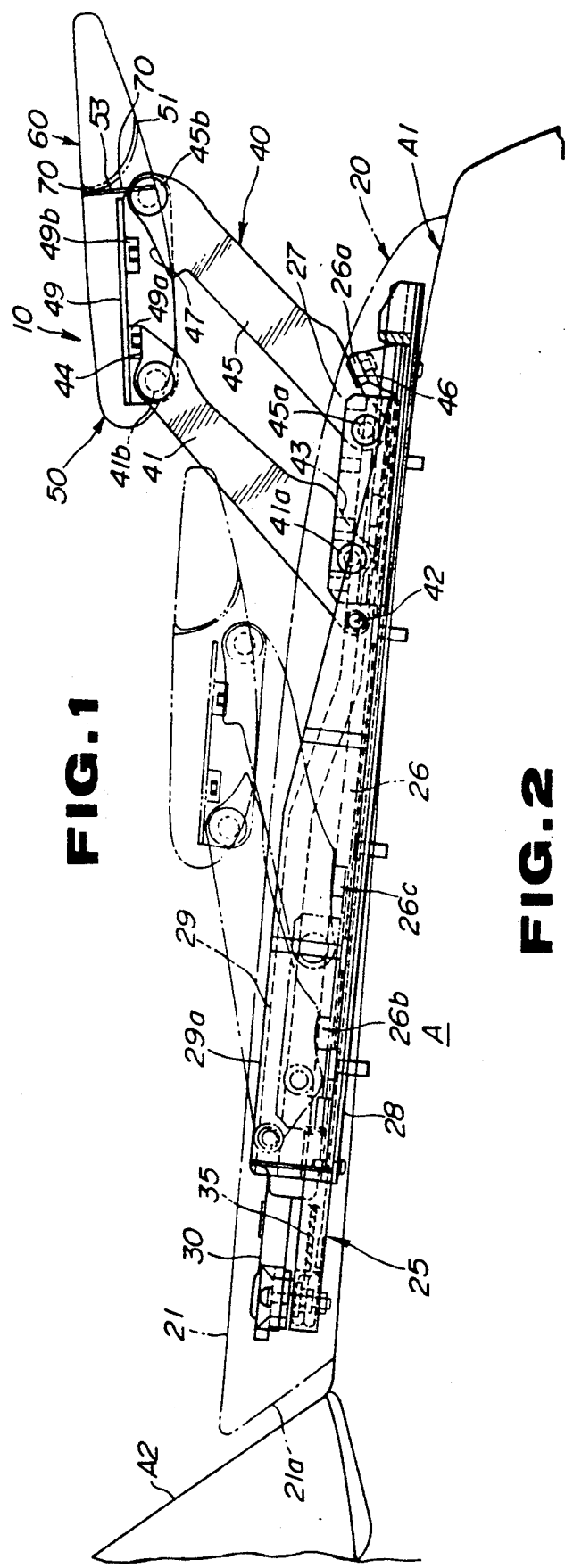
FIG. 1 is a side view of a rear spoiler device of the present invention, which is shown as being mounted on a trunk lid of a motor vehicle.
Figure 7:
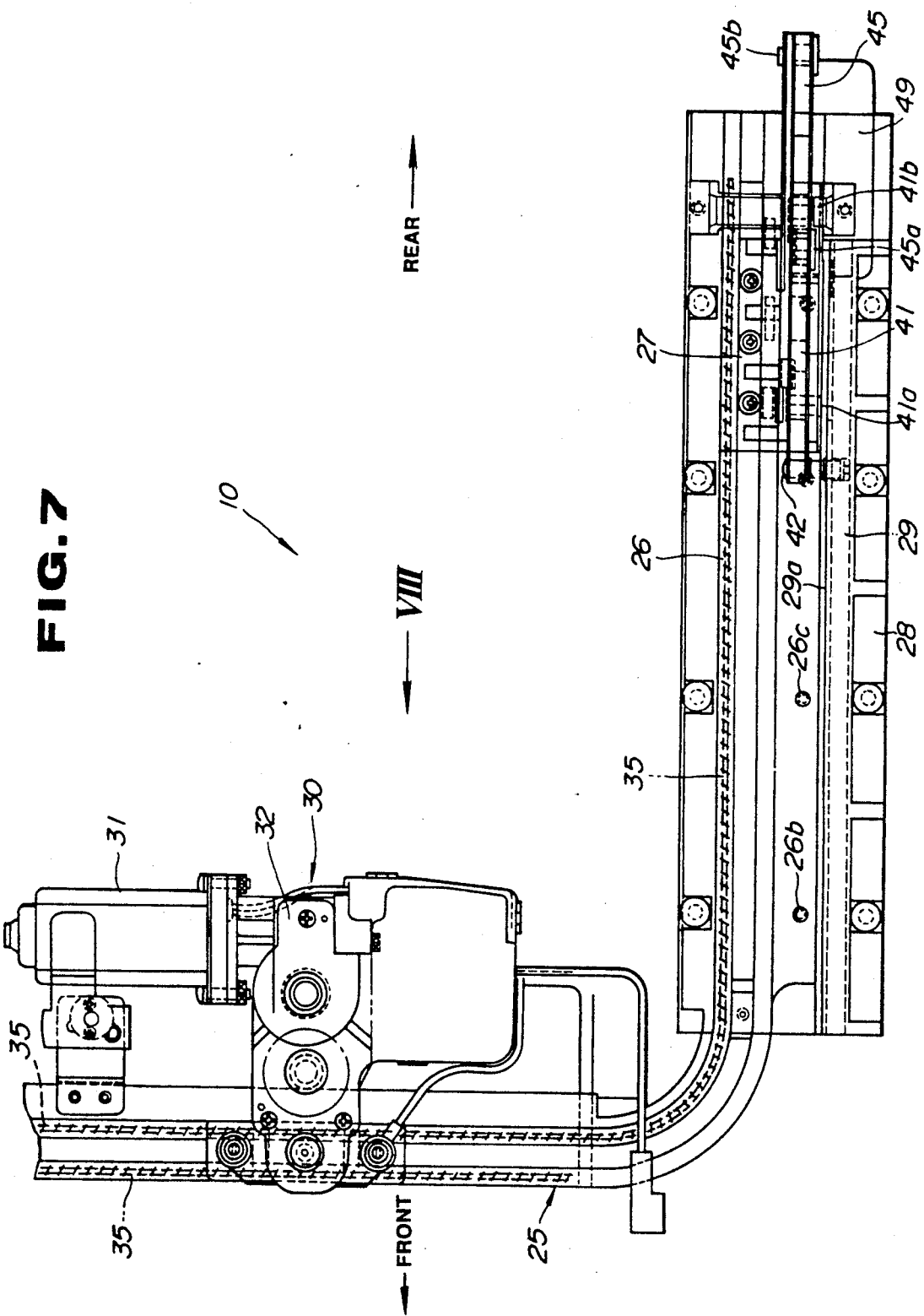
FIG. 7 is a partial plan view of the rear spoiler device with the spoiler fin removed.
Figure 8:
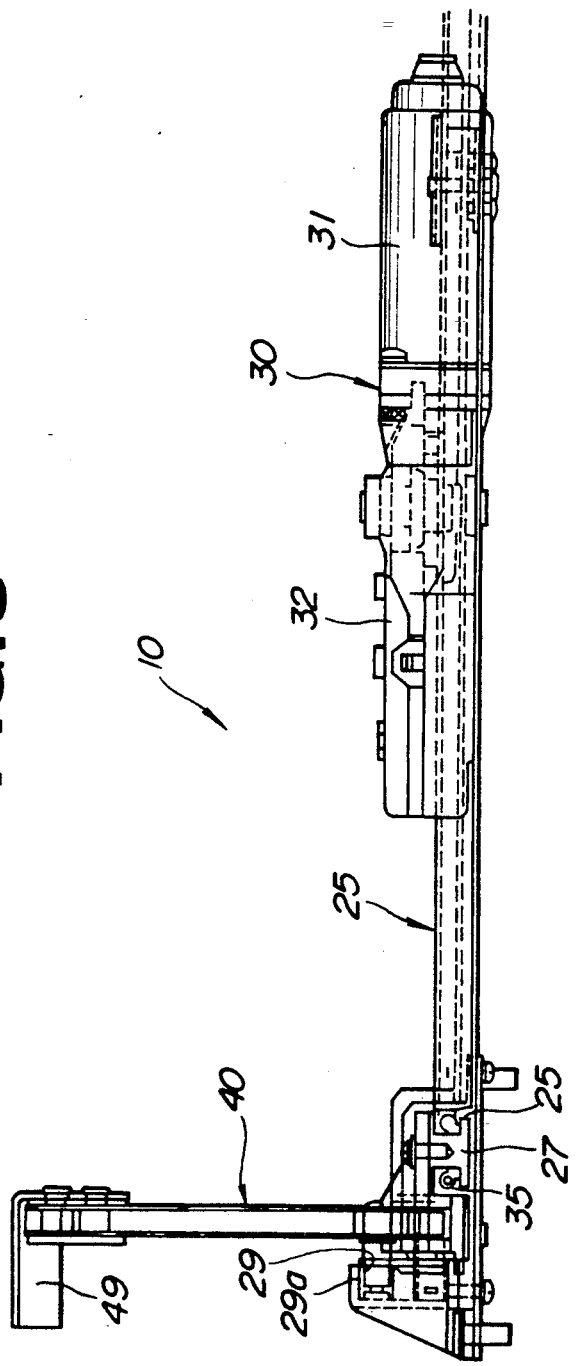
FIG. 8 is a view taken from the direction of the arrow "VIII" of FIG. 7.

As is seen from FIGS. 1 and 7, a power unit 30 is arranged at the straight base portion of the U-shaped guide rail structure 25. As is best seen from FIG. 7, the power unit 30 comprises generally a reversible electric motor 31 and a reduction gear mechanism 32 which are secured to the straight base portion. The reduction gear mechanism 32 has an input gear (not shown) driven by the electric motor 31 and an output gear (no numeral) by which two geared cables 35 and 35 are driven in opposite directions. As is seen from the drawing, each geared cable 35 extends along the straight base portion and one of the opposed side rail portions 26 and 26. These two geared cables 35 and 35 have leading ends respectively connected to the aforementioned sliders 27 and 27. Thus, when, due to energization of the electric motor 31, the output gear of the reduction gear mechanism 32 is rotated, the sliders 27 and 27 are moved in the same direction in and along the respective side rail portions 26 and 26.

As is seen from FIG. 1, each supporting leg unit 40 comprises front and rear leg members 41 and 45. These leg members 41 and 45 have respective lower ends pivotally connected through respective pivot pins 41a and 45a to front and rear portions of one of the sliders 27 and 27. As is seen from FIG. 1, the front and rear leg members 41 and 45 have respective upper ends pivotally connected through pivot pins 41b and 45b to front and rear portions of a bracket 49 which is secured to the spoiler fin 50 by means of front and rear connecting bolts 49a and 49b. Thus, the slider 27, the front and rear leg members 41 and 45 and the bracket 49 constitute a foldable rectangular structure.

As is seen from FIGS. 1 and 7, the front leg member 41 has, at its lower outside surface, a follower pin 42 which is slidably engaged with the aforementioned guide groove 29 of the elongate wall member 29a. Thus, it will be appreciated that when the sliders 27 and 27 are moved along the side rail portions 26 and 26, the supporting leg units 40 and 40 are subjected to a swinging movement. More specifically, when each slider 27 is located at a rear portion of the corresponding side rail portion 26 having the follower pin 42 mated with the lower straight part of the guide groove 29, the unit 40 assumes its raised rear position. While, when the slider 27 is located at a front portion of the side rail portion 26 having the follower pin 42 mated with the upper straight part of the groove 29, the unit 40 assumes its folded front position, as will be understood from FIG. 1.

As is seen from FIG. 1, the side rail portions 26 and 26 each have a rear terminal end on which a stopper member 26a is securedly mounted. As is seen from FIGS. 1 and 7, two stopper members 26b and 26c are further provided at a relatively front portion of each side rail portion 26.

Each front leg member 41 has at its upper end a stopper surface 44 which is brought into abutment with the head of the front connecting bolt 49a when the supporting leg unit 40 assumes its raised rear position. Furthermore, each front leg member 41 has at its lower end portion another stopper surface 43 which is brought into abutment with the stopper member 26b when the supporting leg unit 40 assumes its folded front position.

Each rear leg member 45 has at its lower end portion a stopper surface 46. The stopper surface 46 is brought into abutment with the stopper member 26a when the supporting leg unit 40 assumes its raised rear position, and the stopper surface 46 is brought into abutment with the stopper member 26c when the supporting leg unit 40 assumes its folded front position. Furthermore, each rear leg member 45 has at its upper end portion another stopper surface 47 which is brought into the head of the rear connecting bolt 49b when the supporting leg unit 40 assumes its folded front position.

Figure 6:
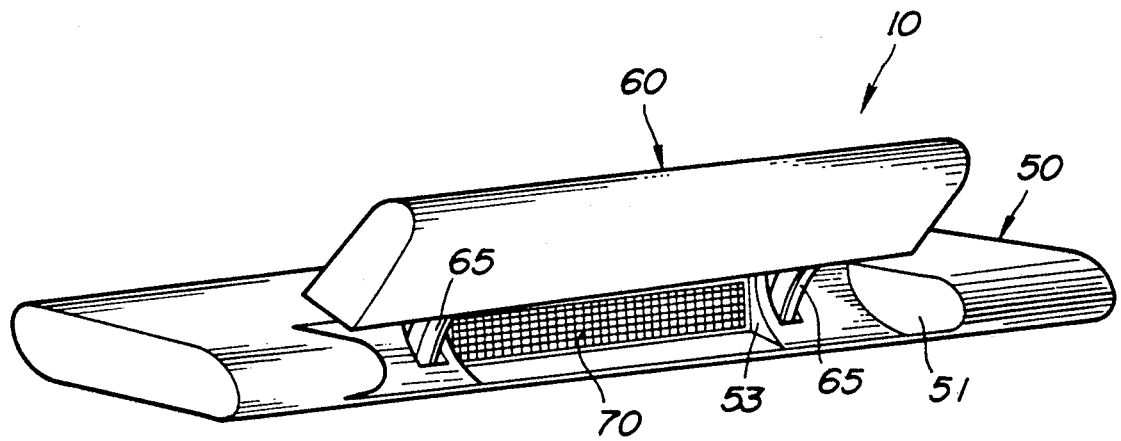
FIG. 6 is a perspective view of the spoiler fin of the rear spoiler device with the flap kept raised.

As is seen from FIGS. 1 and 2, the spoiler fin 50 is equipped with a flap mechanism. The flap mechanism has a flap 60 pivotally mounted on the spoiler fin 50. The flap 60 is pivotal between its "in-use" (or raised) position as shown in FIG. 6 and its "not in-use" (or rest) position as shown in FIG. 2. When the flap 60 assumes the rest position, the same is neatly received in a container space 51 (see FIG. 6) formed in a rear part of the spoiler fin 50.

As is seen from FIG. 2, the pivoting movement of the flap 60 is achieved by two drive units 62 and 62 which are installed in longitudinally spaced portions of the spoiler fin 50.

As is seen from FIGS. 9 and 10, each drive unit 62 comprises a reversible electric motor 61 and a raising mechanism which will be described in detail in the following.

That is, the raising mechanism comprises a threaded shaft 63 which extends in a fore-and-aft direction in the spoiler fin 50. The threaded shaft 63 has a worm gear 63a meshed with a worm 61a which is secured to an output shaft of the electric motor 61. A nut member 64 is operatively disposed on the threaded shaft 63.

A channel-shaped arm member 65 is pivotally connected at its front portion to the nut member 64. That is, as is seen from FIG. 10, for the pivotal connection, side walls of the arm member 65 have at their front portions respective pivot pins 64a pivotally connected to spaced portions of the nut member 64. As is seen from FIG. 6, the arm member 65 has a rear portion which is projected into the container space 51 of the spoiler fin 50 and secured to the flap 60.

Referring back to FIG. 9, the arm member 65 has at the side walls thereof respective arcuate slots 66 through which a guide pin 52 fixed to the spoiler fin 50 passes.

Although not shown in the drawings, a control unit is employed which functions to energize the electric motor 61 to raise the flap 60 when the associated motor vehicle A is braked.

As is seen from FIG. 6, the spoiler fin 50 has at a bottom 53 of the container space 51 a stop lamp 70 which is turned on when the vehicle is braked.

In the following, operation will be described with reference to the drawings.

For ease of understanding, the description will be commenced with respect to the "in-use" position (viz., raised rear position) of the rear spoiler device 10 as shown in FIG. 3.

Under this "in-use" condition, each slider 27 is located at the rearmost position of the corresponding side rail portion 26 having the follower pin 42 placed at the lower straight part of the guide groove 29. Thus, the supporting leg unit 40 is allowed to assume the raised rear position causing the spoiler fin 50 to assume its raised or working position, as illustrated by a solid line in FIG. 1. The raised condition of the spoiler fin 50 may be well understood from FIG. 3. Thus, under this condition, the spoiler fin 50 can stabilize the high-speed movement of the associated motor vehicle.

It is to be noted that under this in-use condition of the rear spoiler device 10, the stopper surface 44 of the front leg member 41 abuts against the front engaging bolt 49a and the stopper surface 46 of the rear leg member 45 abuts against the stopper member 26a. Thus, the rear spoiler device 10 can take the raised or working position without play.

When, due to reduction in speed of the vehicle, the stabilizing effect of the spoiler fin 50 becomes unnecessary, the electric motor 31 is energized manually or automatically to rotate its drive shaft in a certain direction. With this, the two geared cables 35 and 35 pull the sliders 27 and 27 forward. During this forward movement, the follower pin 42 of each slider 27 moves up from the lower straight part of the guide groove 29 to the upper straight part of the same through the inclined junction part of the same, folding the supporting leg unit 40. When the slider 27 comes to the frontmost position, the follower pin 42 is brought into abutment with a front terminal end of the guide groove 29. Thus, under this condition, the supporting leg units 40 and 40 are allowed to assume their folded positions causing the spoiler fin 50 to assume its sinked or rest position, as is shown by a phantom line in FIG. 1. The rest condition of the spoiler fin 50 may be well understood from FIG. 4. Thus, under this rest condition, the stabilizing effect of the spoiler fin 50 is suppressed or at least minimized.

It is to be noted that under this rest condition of the rear spoiler device 10, the stopper surface 43 of the front leg member 41 abuts against the stopper member 26b and the stopper surface 46 of the rear leg member 45 abuts against the stopper member 26c. Thus, the device 10 can take the rest position without play.

Furthermore, since, in this rest position, the supporting leg units 40 and 40 and the spoiler fin 50 are located near the front end of the trunk lid where a lid biasing spring is arranged, the opening operation of the trunk lid is easily achieved with a reduced force.

In the following, operation of the flap 60 will be described with reference to FIGS. 9 and 10.

Usually, the flap 60 is operated under the "in-use" (or raised) condition of the rear spoiler device 10.

Figure 9:
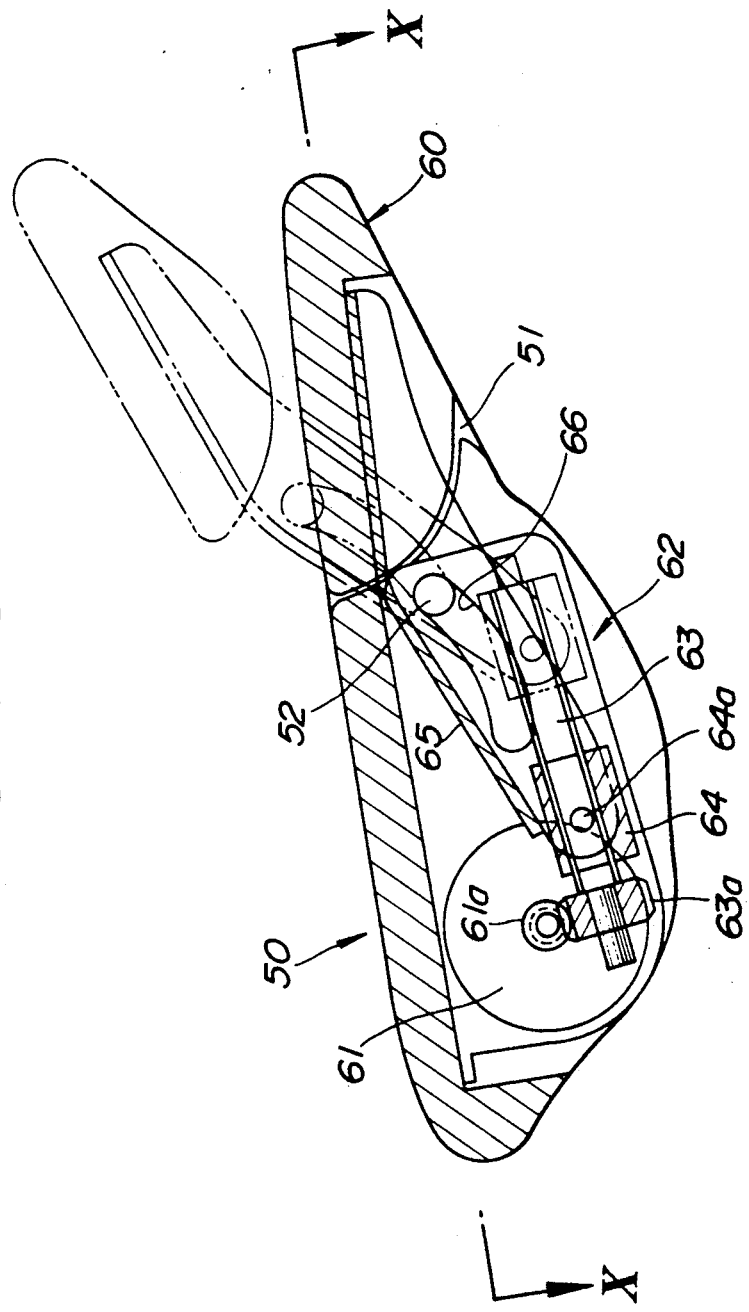
FIG. 9 is a sectional view of the spoiler fin at a position where a flap mechanism is arranged.

For ease of understanding, the description will be commenced with respect to the "not in-use" (or rest) condition of the flap 60, as is shown by a solid line in FIG. 9.

Under this rest condition, the flap 60 is neatly received in the container space 51 (see FIG. 6) formed in the rear part of the spoiler fin 50.

When, due to braking of the associated motor vehicle A, the electric motor 61 of each drive unit 62 is energized, the worm 61a of the motor 61 turns through the worm gear 63a the threaded shaft 63 in a certain direction. With this, the nut member 64 meshed with the threaded shaft 63 is moved along the shaft 63 rearwardly carrying the pivot pin 64a of the arm member 65 in the same direction. During this rearward movement, the arm member 65 is moved rearward while pivoting in a counterclockwise direction in FIG. 9 about the pivot pin 64a due to the sliding engagement of the arcuate slot 66 with the guide pin 52. Thus, finally, the arm member 65 is inclined as is shown by a phantom line in FIG. 9. Thus, under this condition, the flap 60 assumes its "in-use" (or raised) position.

Because the container space 51 becomes empty, the stop lamp 70 which is lighting can be viewed from the rear of the vehicle.

When the braking of the vehicle ceases, the flap 60 is returned to the "not in-use" (rest) position compelling the drive unit 62 to carry out a reversed operation.

Referring to FIG. 11, there is shown a modification of the flap mechanism.

Each drive unit 62a of this modified flap mechanism comprises a reversible electric motor 61 and a raising mechanism which will be described in the following.

The raising mechanism comprises a threaded shaft 63 which extends in a fore-and-aft direction in the spoiler fin 50. The threaded shaft 63 has a worm gear 63a meshed with a worm 61a which is secured to a rotation shaft of the electric motor 61. A nut member 64 is operatively disposed on the threaded shaft 63.

A channel-shaped arm member 67 is pivotally connected at its front upper portion to the solid portion of the spoiler fin 50. For this pivotal connection, side walls of the arm member 67 have at their front upper portions aligned openings through which a pivot pin 67a secured to the solid portion of the spoiler fin 50 passes. The arm member 67 has a rear portion which is projected into the container space 51 (see FIG. 6) of the spoiler fin 50. The arm member 67 has at the front lower portions of the side walls respective and aligned elongate slots 68a through which a guide pin 64a from the nut member 64 passes.

When, in operation, the electric motor 61 is energized, the worm 61a of the electric motor 61 turns through the worm gear 63a the threaded shaft 63 in a certain direction. With this, the nut member 64 meshed with the threaded shaft 63 is moved along the shaft 63 rearwardly carrying the guide pin 64a in the same direction. During this rearward movement, the arm member 67 is pivoted in a counterclockwise direction in FIG. 11 about the pivot pin 67a. Thus, finally, the arm member 67 is inclined as shown by a phantom line in FIG. 11. Under this condition, the flap 60 assumes its "in-use" (or raised) position.

The movement of the flap 60 from the "in-use" (or raised) position to the "not in-use" (rest) position is carried out by reversely operating the drive unit 62a.

What is claimed is:

1. An air spoiler device for use with a motor vehicle having a pivotal lid which is pivotable upward and downward about its hinged portion relative to a body of said motor vehicle, said air spoiler device comprising:
    a base member mounted on said pivotal lid to pivot therewith;
    two parallel rail members secured to said base member and extending perpendicular to a pivot axis of said hinged portion of said pivotal lid;
    two sliders each slidably engaged with one of said rail members, so that each slider is slidable along the corresponding rail member toward or away from said hinged portion;
    two supporting leg units each respectively mounted on one of said sliders;
    folding and raising means for folding and raising said two supporting leg units in response to the movement of said sliders along said rail members toward and away from said hinged position;
    a spoiler fin mounted on the supporting leg units;
    drive means for moving said sliders along said rail members, and wherein said folding means comprises an elongate wall member secured to each of said rail members and extending therealong, said elongate wall member having a longitudinally extending guide groove which is bent at its generally middle part, first pivot means for permitting a pivotal connection between each of said supporting leg units and the corresponding slider, second pivot means for permitting a pivotal connection between each of the supporting leg units and the spoiler fin, and a follower pin fixed to a given portion of each of said supporting leg units and slidably engaged with the longitudinally extending guide groove of the elongate wall member.

2. An air spoiler device as claimed in clam 1, in which said drive means comprises:
    a geared cable which extends along each of said rail members and has a portion secured to each of said sliders; and
    a drive unit for moving said geared cables in such a manner that the sliders are moved together in the same direction.

3. An air spoiler device as claimed in claim 2, wherein said drive unit comprises;
    a reversible electric motor; and
    a speed reduction gear mechanism driven by said electric motor, said speed reduction gear mechanism having an output gear with which said gear cables are operatively engaged.

4. An air spoiler device as claimed in claim 3, wherein said geared cables have extensions which are meshed with diametrically opposed portions of the output gear of the speed reduction gear mechanism.

5. An air spoiler device as claimed in claim 4, wherein said parallel rail members have front ends integrally connected to each other through a straight base member, thereby constituting a generally U-shaped guide rail structure.

6. An air spoiler device as claimed in claim 1, wherein said guide groove of the elongate wall member comprises an upper part substantially parallel to a surface of the lid located at a front portion of the wall member, a lower part substantially parallel to the surface of the lid located at a rear portion of the wall member and an inclined junction part located between the upper and lower parts.

7. An air spoiler device as claimed in claim 1, wherein each of the supporting leg units comprises:
    front and rear leg members which have respective lower ends pivotally connected by said first pivot means to spaced portions of the slider and respective upper ends pivotally connected by said second pivot means to spaced portions of a bracket which is secured to the spoiler fin; and
    wherein the front leg member has the follower pin at the front lower portion thereof.

8. An air spoiler device as claimed in claim 7, wherein each one of said front and rear leg members has upper and lower stopper surfaces, said upper stopper surface of said front leg member being brought into abutment with the spoiler fin-mounted bracket, and the lower stopper surface of said rear leg member being brought into abutment with the respective rail member when the supporting leg unit assumes a raised position.

9. An air spoiler device as claimed in claim 7, wherein each one of said front and rear leg members has lower and upper stopper surfaces, said lower stopper surface of said front leg member being brought into abutment with said rail member and said upper stopper surface of said rear leg member being brought into abutment with said spoiler fin mounted bracket when the leg unit assumes a lowered position.

10. An air spoiler device as claimed in claim 9, wherein said drive means comprises:
    a geared cable which extends along each of the rail members and is secured to the sliders; and
    a drive unit for moving the geared cables in such a manner that the sliders are moved together in the same direction.

11. An air spoiler device as claimed in claim 10, wherein the drive unit comprises:
    a reversible electric motor; and
    a speed reduction gear mechanism driven by the electric motor, the speed reduction gear mechanism having an output gear with which said two geared cables are operatively engaged.

12. An air spoiler device as claimed in claim 10, in which said geared cables have extensions which are meshed with diametrically opposed portions of the output gear of the speed reduction gear mechanism.

13. An air spoiler device as claimed in claim 12, in which said two parallel rail members have front ends integrally connected to each other through a straight base member thereby constituting a generally U-shaped guide rail structure.

14. An air spoiler device as claimed in claim 13, wherein said electric motor and said speed reduction mechanism are mounted to the straight base member of said generally U-shaped guide rail structure.

15. An air spoiler device for use with a motor vehicle having a pivotal lid which is pivotal upward and downward about its hinged portion relative to a body of said motor vehicle, said air spoiler device comprising:

a base member mounted on said pivotal lid to pivot therewith;

two parallel rail members secured to said base member and extending perpendicular to a pivot axis of said hinged portion of said pivot lid;

two sliders each slidably engaged with one of said rail members, so that each slider is slidable along the corresponding rail member toward the hinged portion or away from the same;

two supporting leg units each mounted on one of said sliders;

folding and raising means for folding and raising said two supporting leg units in response to the movement of said sliders along said rail members toward and away from said hinged portion;

a spoiler fin mounted on the supporting leg units;

drive means for moving said sliders along said rail member;

a flap mechanism comprising a flap pivotally mounted on the spoiler fin, said flap being pivotal between a raised position wherein said flap is raised from the spoiler fin and a rest position wherein the flap is neatly received in a container space defined in the spoiler fin; and two identical drive units mounted in the spoiler fin to actuate said flap.

16. An air spoiler device as claimed in claim 15, wherein each drive unit comprises:

a reversible electric motor;

a threaded shaft driven by said motor;

a nut member operatively disposed on said threaded shaft;

an arm member having a rear portion projected into said container space and secured to said flap; and converting means for converting the movement of said nut member along said threaded shaft to a pivotal movement of said arm member.

17. An air spoiler device as claimed in claim 16, wherein said converting means comprises:

means for pivotally connecting a front end of said arm member to said nut member;

means defining in a front portion of said arm member a curved slot; and a guide pin fixed to a solid portion of said spoiler fin and passing through said curved slot of the arm member.

18. An air spoiler device as claimed in claim 16, wherein said converting means comprises:

means for pivotally connecting a front upper portion of said arm member to a solid portion of said spoiler fin;

means defining in a front lower portion of said arm member an elongate slot; and a guide pin secured to said nut member and operatively engaged with said elongate slot.

19. An air spoiler device as claimed in claim 18, in which said folding means comprises:

an elongate wall member secured to each of said rail members and extending therealong, said elongate wall member having a longitudinally extending guide groove which is bent at its generally middle part, first pivot means for permitting a pivotal connection between each of said supporting leg units and the corresponding slider, second pivot means for permitting a pivotal connection between each of said supporting leg units and said spoiler fin, and a follower pin fixed, to each of the supporting leg units and slidably engaged with said longitudinally extending guide groove of said elongate wall member.

20. An air spoiler device as claimed in claim 19, wherein said guide groove of said elongate wall member comprises an upper part substantially parallel to a surface of the lid located at a front portion of the wall member, a lower part substantially parallel to a surface of the lid located at a rear portion of the wall member and an inclined junction part located between said upper and lower parts.

21. An air spoiler device as claimed in claim 20, wherein each of said supporting leg units comprises:

front and rear leg members which have respective lower ends pivotally connected by said first pivot means to spaced portions of said slider and respective upper ends pivotally connected by said second pivot means to spaced portions of a bracket which is secured to said spoiler fin, wherein said front leg member has said follower pin at the front lower portion thereof.

22. An air spoiler device for use with a motor vehicle having a pivotal lid which is pivotable upward and downward about its hinged portion relative to a body of said motor vehicle, said air spoiler device comprising:

two parallel rail members secured to said lid and extending perpendicular to a pivot axis of said hinged portion of said pivotal lid;

two sliders, each slidably engaged with one of said rail members, so that each slider is slidable along the corresponding rail member toward or away from said hinged portion;

two supporting leg units each mounted on one of said sliders;

folding and raising means for folding and raising said two supporting leg units in response to the movement of said sliders along said rail members toward and away from said hinged portion;

a spoiler fin mounted on the supporting leg units;

drive means for moving said sliders along said rail members; and wherein said folding means comprises an elongate wall member secured to each of said rail members and extending therealong, said elongate wall member having a longitudinally extending guide groove which is bent at its generally middle part, first pivot means for permitting a pivotal connection between each of said supporting leg units and the corresponding slider, second pivot means for permitting a pivotal connection between each of the supporting leg units and the spoiler fin, and a follower pin fixed to a given portion of each of said supporting leg units and slidably engaged with the longitudinally extending guide groove of the elongate wall member.

* * * * *